US008638713B2

(12) United States Patent
Shen et al.

(10) Patent No.: US 8,638,713 B2
(45) Date of Patent: Jan. 28, 2014

(54) NON-INTRUSIVE IN-SESSION QOS PARAMETER MODIFICATION METHOD

(75) Inventors: Jun Shen, Redmond, WA (US); Yung Shirley Choi-Grogan, Issaquah, WA (US); Ming Zhang, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 437 days.

(21) Appl. No.: 11/607,397

(22) Filed: Dec. 1, 2006

(65) Prior Publication Data
US 2008/0132269 A1   Jun. 5, 2008

(51) Int. Cl.
*H04W 4/00* (2009.01)

(52) U.S. Cl.
USPC ..... 370/328; 370/395.2; 370/329; 455/452.2; 455/550.1

(58) Field of Classification Search
USPC ............ 455/550.1–575.9, 452.2; 370/395.21, 370/395.2
See application file for complete search history.

(56) References Cited

U.S. PATENT DOCUMENTS

| | | | |
|---|---|---|---|
| H002051 H | 11/2002 | Zhu et al. | |
| 6,683,853 B1 * | 1/2004 | Kannas et al. | 370/237 |
| 6,701,155 B2 | 3/2004 | Sarkkinen et al. | |
| 6,910,074 B1 * | 6/2005 | Amin et al. | 709/227 |
| 6,944,473 B2 * | 9/2005 | Irwin et al. | 455/550.1 |
| 7,106,718 B2 * | 9/2006 | Oyama et al. | 370/340 |
| 7,167,447 B2 * | 1/2007 | Puuskari et al. | 370/231 |
| 7,318,111 B2 | 1/2008 | Zhao | |
| 7,688,859 B2 | 3/2010 | Chen et al. | |
| 2004/0037269 A1 | 2/2004 | Lundin | |
| 2004/0082363 A1 * | 4/2004 | Hosein | 455/560 |
| 2004/0156341 A1 * | 8/2004 | Cheng et al. | 370/335 |
| 2006/0002377 A1 * | 1/2006 | Skog et al. | 370/352 |
| 2006/0221829 A1 | 10/2006 | Holmstrom et al. | |
| 2006/0251093 A1 * | 11/2006 | Curcio et al. | 370/412 |
| 2007/0204050 A1 * | 8/2007 | Liu et al. | 709/230 |
| 2008/0013470 A1 * | 1/2008 | Kopplin | 370/310 |

OTHER PUBLICATIONS

H. Granbohm et al., "GPRS—General packet radio service", Ericsson Review No. 2, 1999, copy consists of 9 pages.
R. Ahola et al., "GSM/EDGE Radio Access Network", Mobile Internet Technical Architecture, vol. 1, pp. 169-183, Oct. 29, 2003, copy consists of 16 pages.
I. Jøstad, "General Packet Radio Service (GPRS)", Mobile Telematics, 2004, pp. 1-8.
3GPP TS 23.107 V6.1.0 (Mar. 2003). 3rd Generation Partnership Project; Technical Specification Group Services and System Aspects; Quality of Service (QoS) concept and architecture (Release 6).
"IP-based next-generation wireless networks; systems, architectures, and protocols"; Jyh-Cheng Chen, Tao Zhang, p. 65-67, ISBN 0-471-23526-1.

\* cited by examiner

*Primary Examiner* — Jean A. Gelin
*Assistant Examiner* — Qun Shen

(57) ABSTRACT

Wireless network nodes are configured to transmit a request to update the quality of service associated with an existing radio access bearer. In response to the request, the radio access bearer is updated without tearing down the established radio access bearer. Some applications can be associated with one or more quality of service indicia, so that as service demands change in use of a single application, requests for quality of service updates can be transmitted by, for example, a mobile station or other network nodes. Updates can be initiated by other user equipment or by network nodes such as gateway GPRS support nodes. Service interruptions can be reduced by preserving a radio access bearer (RAB), which is particularly useful for a stationary mobile station that continues to communicate with the same serving GPRS support node.

16 Claims, 9 Drawing Sheets

NON-INTRUSIVE IN-SESSION QOS PARAMETER MODIFICATION METHOD

TECHNICAL FIELD

The disclosure pertains to wireless communication.

BACKGROUND

Cellular phone networks offer subscribers a variety of communication services. Basic network services permit mobile subscribers to place and receive phone calls and exchange text messages. Network configurations for such services are specified in several cellular network standards such as, for example, the Global System for Mobile Communication (GSM) standard that is in widespread use throughout the world. GSM uses digital time-division multiple access (TDMA) to arrange 200 kHz communication channels into eight time slots. In addition to voice services, text messaging is provided as Short Message Service (SMS) messaging. While GSM SMS message length is limited, use of SMS messaging is widespread, particularly among teenage network users.

Network subscribers continue to demand services in addition to voice and text messaging, and cellular network standards have been developed or modified in order to accommodate provision of additional services. For example, GSM networks frequently provide data transfers in accordance with the General Packet Radio Service (GPRS) protocol or the Enhanced Data rates for GSM Evolution (EDGE) protocol. A Universal Mobile Telecommunications System (UMTS) Terrestrial Radio Access Network (UTRAN) completes radio bearer setup to the user device. UMTS can be configured to provide data transfer rates of up to about 14 Mbit/s. Typical implementations provide data rates of between about 384 kbit/s and 2 Mbit/s. UMTS provides access to high data rate services such as multimedia messaging, TV and video entertainment, mobile internet access, and video calling. Base stations and Radio Network Controllers (RNCs) are included in the UTRAN. The base stations include an interface for connection to user equipment and the RNCs include an interface for connection to a core network. An RNC and any associated base stations are sometimes referred to as a Radio Network Subsystem.

Allocation of network resources to a particular subscriber can be based on the type of service requested. For example, data rates needed for satisfactory voice and video services can be considerably different. In addition, preferred network requirements for transmission of live video are generally different than those for transmission of stored video clips. In current systems, quality of service (QoS) can only be setup upon service initiation and establishment of a packet data protocol (PDP) context and a corresponding radio bearer. Initiating a new service or a new application that requires a different QoS requires a new radio bearer and a new PDP context. If a user starts a communication such as web browsing using an interactive QoS class, this QoS class is used for the radio bearer. If the user finds a streaming video site and starts a video download, the application continues to use the interactive QoS class, lacking any ability to notify the network of the QoS change. Even if the network were notified, a new QoS can only be provided by establishing a new PDP context and a new radio bearer. Thus, changing QoS parameters can require multiple radio bearers and multiple PDP contexts, even though the user may only use one application at a time.

In one existing method, a user initiates a first application, and a PDP activation request is sent and accepted by a serving GPRS support node (SGSN). Prior to initiating a second application with a different QoS profile, the user must stop the first application so that the network can tear down the first PDP context and the radio bearer. The user then starts the second application, and the network requests a second PDP context activation with a second QoS profile. A second radio bearer is setup per this second QoS profile. Not only is this procedure slow, frustrating the user, in some cases, the second PDP context fails to be activated. For example, if the user fails to terminate the first application or the network load is at a peak, then PDP context activation for the second application may be blocked. Another disadvantage of this procedure is that different access point information and PDP context information should be provisioned both at mobile devices and in the wireless network at, for example, a Home Location Register (HLR). Typical networks avoid such provisioning by sharing access point and PDP context information over a variety of applications. Unfortunately, different applications such as email, web access, instant messaging, and video sharing have very different QoS requirements that cannot be met in such systems.

In another existing method, a PDP activation request is sent and accepted by an SGSN for a first application, and the UTRAN completes radio bearer setup to the device. If the user initiates a second application with a different QoS profile, the network will setup a second PDP context if a multiple PDP context feature is permitted by the network. A new PDP context will be setup, without tearing down the original radio bearer. In this case, the original radio bearer may not satisfy the new QoS for the new PDP context. In addition, configuring a network to permit multiple PDP context functionality can be expensive, and some networks and devices do not support multiple PDP contexts. For such networks and devices, this multiple PDP context procedure cannot be used. Multiple PDP contexts are also disadvantageous in that each of the multiple PDP contexts associated with a mobile station consumes a portion of network radio resources, so that network efficiency is reduced.

Thus, as described above, current systems use radio resources inefficiently and provide a poor user experience, and networks that provide multiple services can be burdened by the processing of service requests. In view of these and other shortcomings, improved methods and apparatus for service provisioning are needed.

SUMMARY

Mobile stations include a memory that stores at least one quality of service parameter and a transceiver configured to transmit a request to update communication service status based on the at least one quality of service parameter (QoS). In an example, the service status is a packet data protocol (PDP) context. In additional examples, mobile stations also include a processor configured to execute at least one application based on computer executable instructions stored in the memory. The mobile station transceiver is configured to transmit the request to update communication service status in response to execution of an application by the processor. The QoS parameter is associated with a data rate, a bit error rate, or a data latency. In further examples, the memory stores at least a first QoS parameter and a second QoS parameter associated with a first application, wherein the first QoS parameter is different from the second QoS parameter. The transceiver is configured to transmit a request to update the service status based on one of the first and second QoS parameters. In some examples, a processor is configured to execute a first application and a second application, and the transceiver is configured to transmit a request for an updated service status based on the first and second QoS parameters in response to initiation of the first and second applications, respectively.

Communication methods include initiating a first application on a wireless communicator, and transmitting a request for services that includes an indication of a first requested quality of service (QoS) for the first application. A request for a QoS is transmitted in response to a change in a current QoS. In representative examples, the requests for services are requests for packet data services, and a packet data protocol (PDP) context is established based on the first requested QoS, and updated in response to the second QoS request. According to additional examples, a second application is initiated and a request for a QoS for the second application is transmitted. The PDP context is updated based on the requested QoS for the second application.

Network nodes include a receiver configured to accept an indication of a requested QoS and a transmitter configured to communicate the requested QoS to a wireless communication network. The receiver is configured to send/receive an acknowledgement that the requested QoS is accepted. In other examples, the network node includes a processor configured to determine if a requested QoS is different from a current QoS, and to communicate the request for the QoS based on the determination. In a typical example, the acknowledgement is associated with a packet data protocol (PDP) context associated with the requested QoS that is in turn associated with at least one of a bit rate, bit error rate, or latency.

Radio resource controllers include a processor configured to establish a radio resource allocation based on a requested QoS. An input is configured to receive an updated QoS indication, wherein the processor is configured to update the QoS of the radio resource allocation based on the indication. In some examples, the radio resource allocation is associated with a packet data protocol (PDP) context. In additional examples, the requested QoS is associated with at least one of data rate, bit error rate, or latency. In other examples, the updated QoS is associated with a service class change, wherein an updated service class is selected from a group consisting of conversational, streaming, interactive, and background service classes.

These and other features and aspects of the disclosed technology are set forth below with reference to the accompanying drawings.

DETAILED DESCRIPTION

Figure 1A:
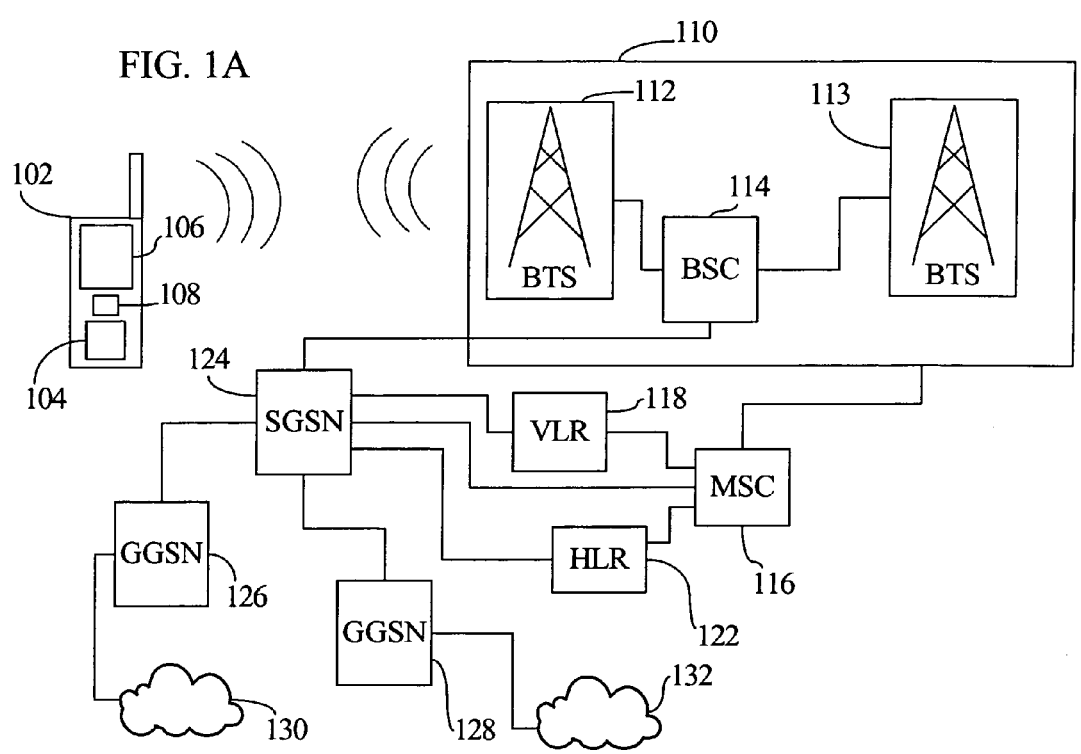
FIGS. 1A-1B illustrate portions of representative wireless communication networks that provide PDP context updates without tearing down a radio bearer.

As used in this application and in the claims, the singular forms "a," "an," and "the" include the plural forms unless the context clearly dictates otherwise. Additionally, the term "includes" means "comprises." Further, the term "coupled" means electrically or electromagnetically coupled or linked and does not exclude the presence of intermediate elements between the coupled items.

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Network communications in cellular or other networks can be configured to provide a selected quality of service (QoS) that can be based on, for example, a selected data rate, data latency, bit error rate, or other service parameter. A request from a mobile station for a particular service can be used to allocate network resources for satisfactory performance of the service, and, resources can be allocated differently for different services. For example, transmission of real time video can require lower latency than transmission of stored video. In a representative example of the disclosed technology, a QoS associated with an active radio access bearer (RAB) is renegotiated or updated for a currently active service to reflect variable demands of the service without tearing down and re-establishing the active RAB. In this way, the QoS can be updated without consuming unnecessary network resources and without allocation of an additional radio resource. While examples below are based on particular radio access networks, the disclosed technology is not limited to any particular radio access technology.

An appropriate QoS can be associated with a service class. For example, service classes indicated as "conversational" are preferably associated with near real time communication with low latency and low jitter. A "streaming" service class can be similar but in such a service class, only communication in a single direction need be nearly real time. "Interactive" services are associated with responses to requests and low round trip delays are preferred. "Background" services can be transmitted on a "best efforts" basis. For example, email transmission can be associated with best efforts communication.

A packet data protocol (PDP) context can be used to establish a variety of parameters selected for a particular communication or application. A PDP context generally includes QoS parameters as well as information related to user billing and delivery addresses. PDP context parameters can be stored in user equipment in, for example, a subscriber identity module (SIM), or in network nodes or servers such as at an serving GPRS support node (SGSN), or a gateway GPRS support node (GGSN). A PDP context can include different parameters for uplink and downlink, or the same parameters can be used for both.

Referring to FIG. 1A, a mobile station 102 or other user equipment includes a keypad 104 or other user input device for selection of network services, input of messages and message destinations, phone numbers, or other information. In a typical mobile station, the keypad 104 includes a four by three array of keys for alphanumeric input, and arrow keys or other directional keys for selecting among options presented on a mobile station display 106, as well as keys for initiating and terminating voice calls or other communications or applications. User input can also be provided via voice recognition, a touch pad, or other pointing device included in or external to the mobile station 102. While cell phones are common, other user equipment can be used such as, for example, laptop or palmtop computers, personal digital assistants, as well as equipment that is not mobile.

The mobile station 102 typically includes a subscriber identification module (SIM) 108 that includes a memory that stores various parameters associated with the subscriber and services available to the subscriber. The SIM 108 also provides storage for address book and other data input by the subscriber and user applications, although the mobile station 102 can include additional non-SIM memory for data and applications. Service data stored on the SIM 108 (or elsewhere) is generally provided by a network operator during activation, and is not available for modification by the user. Such service data can include requested QoS indicia for some or all services available or subscribed to by a particular subscriber. For some services, several different QoS indicia can be provided for some or all services, depending on the communication demands imposed by the particular service or application, subscriber billing requirements, or otherwise selected.

The mobile station 102 generally communicates with a base station subsystem (BSS) or radio network system (RNS) 110 that includes base transceiver stations (BTS or Node B) 112, 113 coupled to a base station controller (BSC) or radio network controller (RNC) 114. The BSS (or RNS) 110 typically includes a plurality of base transceiver stations to provide network access in a coverage area, but only two are shown in FIG. 1. The BSS 110 is coupled to a mobile switching center (MSC) 116 and a visitor location register 118. The VLR 118 is configured for communication with a home location register (HLR) 122 that generally stores subscriber data such as services available to the subscriber. Data from the HLR 122 can be relayed to the VLR 118 upon entry of a subscriber into a coverage area associated with the MSC 116. Quality of service (QoS) parameters can be stored in the HLR 122 and relayed to the VLR 118. In some cases, the mobile station notifies one or more network nodes that an updated QoS is needed, and selected QoS parameters can be retrieved from the HLR 122 (or the VLR 118) based on the notification. For example, the HLR 122 can store one or more QoS parameters associated with particular applications or service requests.

For data transmission using General Packet Radio Service (GPRS), the BSS 110 is coupled to a serving GPRS support node (SGSN) 124 that is in communication with gateway GPRS support nodes (GGSN) 126, 128. The GGSNs 126, 128 are coupled to, for example, networks such as a public data network (PDN) 130, the Internet 132, or other networks such as a public land mobile network (PLMN). The illustrated network can include a additional network elements and the disclosed technology is not limited to the particular arrangement of FIG. 1A.

Figure 1B:
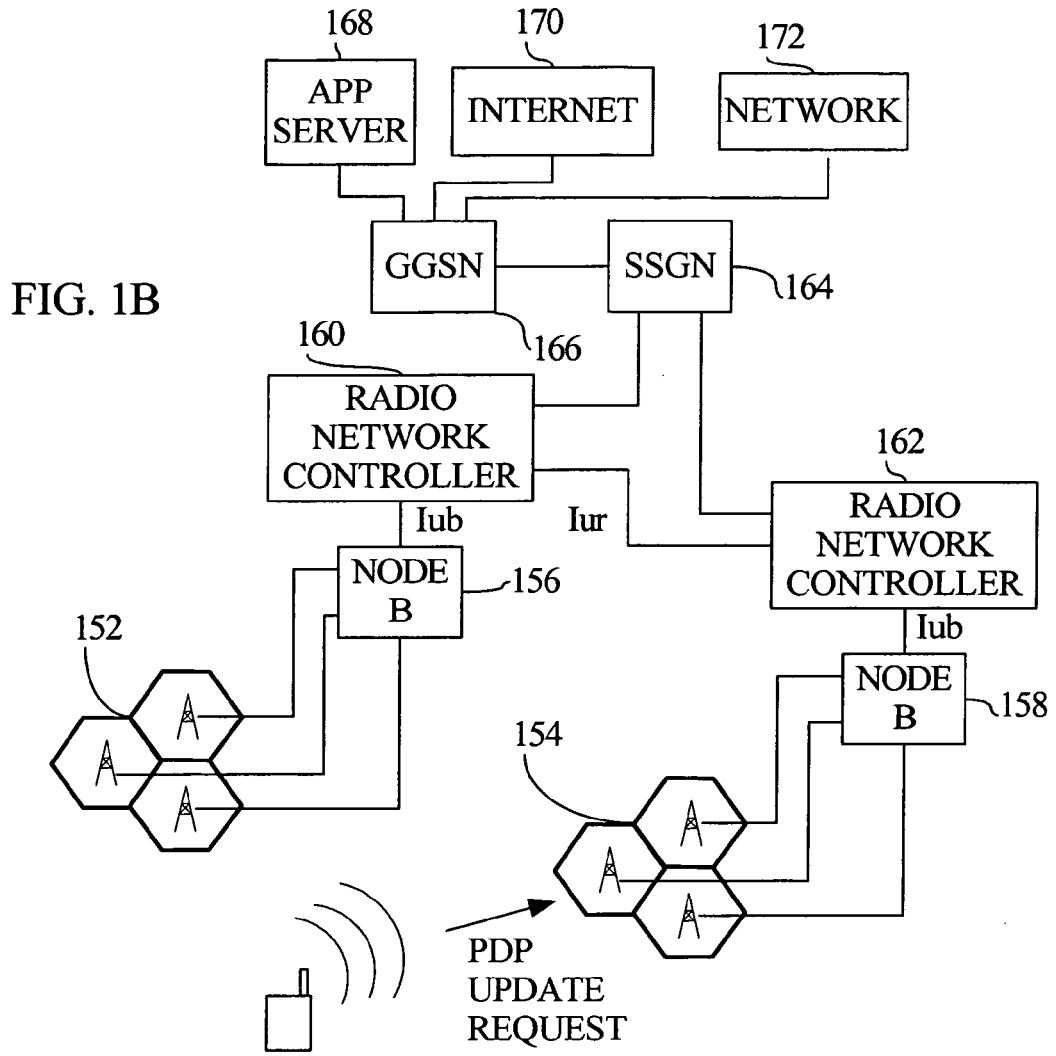

A representative third generation (3G) Universal Mobile Telecommunications System (UMTS) Terrestrial Radio Access Network (UTRAN) is illustrated in FIG. 1B. Representative coverage areas 152, 154 are coupled to respective Node Bs 156, 158 and Radio Network Controllers (RNCs) 160, 162. The RNCs 160, 162 are coupled to an SGSN 164 that is in communication with a GGSN 166 that provides a connection to application servers 168, the Internet 170, or other networks 172. Other typical networks components such as a home location register (HLR), a visitor location register (VLR), and other such components are not shown. UMTS provides communication interfaces such Iub, Iur for communication between RNCs and between Node Bs and RNCs, but these and other UMTS interfaces are not described in further detail herein.

FIGS. 1A-1B illustrate representative network configurations based on GPRS and UMTS. These configurations are representative, and other network configurations and combinations of network configurations can be used. For example, in the network of FIG. 1B, each node B is shown as serving three cells. In other examples, one or more node Bs can be configured to serve one or more cells, and the node Bs can serve different numbers of cells. A single RNC can be coupled to one or more node Bs, and RNC/Node B functions can be combined.

The mobile station 102 is typically provided with various applications that have differing communication demands. Common applications include web browsers, instant messaging applications, email applications, media players, multi-player games, short message service, and voice service. Requested QoS values for one or all of these services can be stored at the mobile station 102 in the SIM 108 or at one or more other network locations such as a HLR, VLR, or a serving node.

Figure 2:
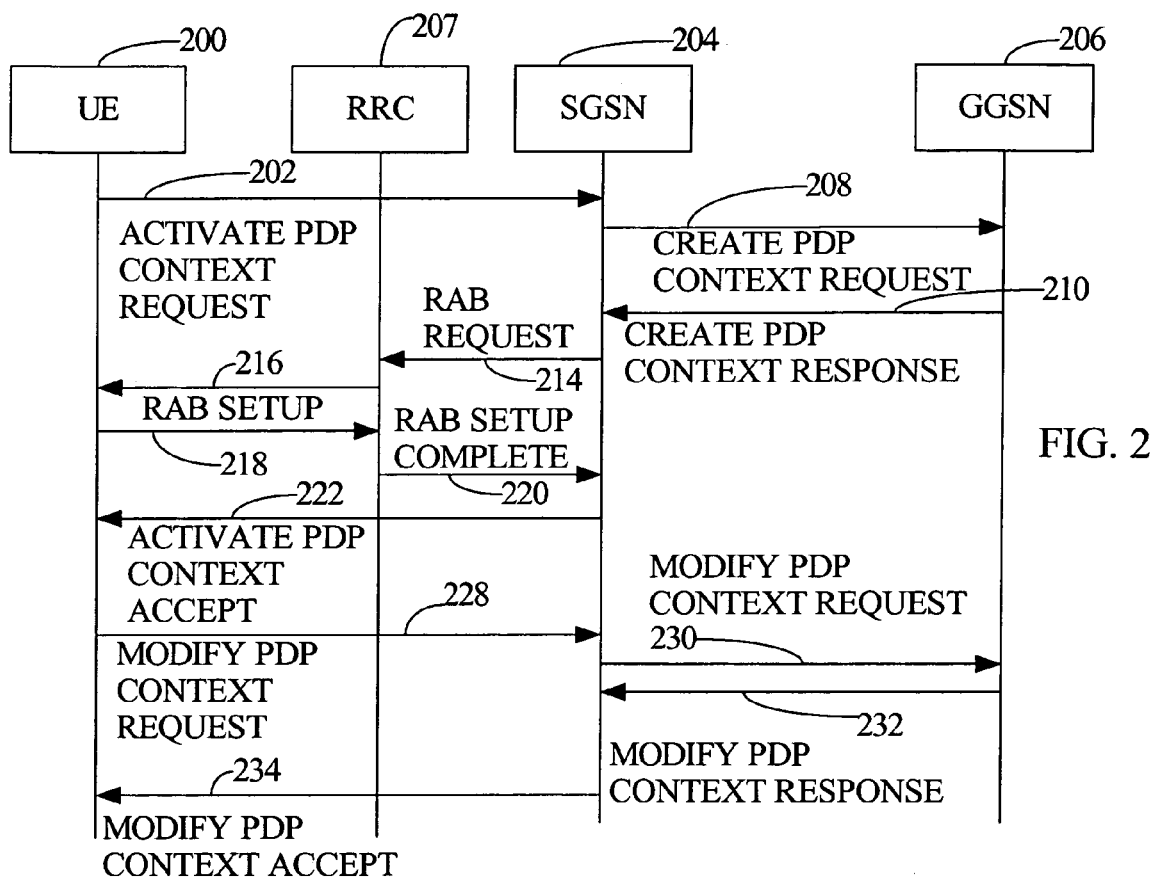
FIG. 2 illustrates messaging associated with establishing and modifying a PDP context in response to a user service request.

Data communication with user equipment such as a mobile station can be established based on so-called Packet Data Protocol (PDP) context activation. Referring to FIG. 2, a subscriber initiates a request for services at a mobile station or other user equipment (UE) 200, and the mobile station 200 issues a PDP context activation request 202 that is directed to an SGSN 204. The PDP context activation request 202 can include connection specifications such as, for example, a network access point name (APN), a type of network, a preferred or mandatory quality of service (QoS), or other connection characteristics. In some examples, connection specifications can be based on predetermined characteristics of the selected service, and the connection characteristics can be stored elsewhere in the network.

The SGSN 204 validates the context activation request 202 based on subscriber data from a network HLR, and retrieves a network address for a GGSN 206 that is associated with the requested service. The SGSN 204 issues a create PDP context request 208 to the GGSN 206 that returns a create PDP context response 210 to the SGSN 204. The SGSN 204 issues a request for radio resources 214 (i.e., to establish a radio access bearer or RAB) to a radio resource controller (RRC) 207 and RAB setup messages 216, 218 are exchanged between the mobile station 200 and the RRC 207. The RRC 207 notifies the SGSN 204 that RAB is established in a message 220, and the mobile station 200 is notified that the PDP context has been activated in message 222.

After network resources are allocated to an application or service based on such a PDP context request, the subscriber can take advantage of the allocated resources. However, if the subscriber initiates a different application or uses a current application in a manner associated with a different QoS, the QoS associated with the established PDP context can be updated. For example, if the mobile station 200 requests transmission of a message type different than a current message type, Modify PDP Context messages 228, 230 are transmitted to SGSN 204, and the GGSN 206, respectively. The GGSN 206 transmits a Modify PDP Context response 232 to the SGSN 204, and a Modify PDP Context Accept message 234 is forwarded to the mobile station 200. Communication then proceeds based on the updated PDP context.

The radio access bearer (RAB) serves to connect a mobile station or other user equipment to a core network based on configuration parameters and other implementation details associated with radio resources. By updating an existing PDP context, a Core Network (consisting of, for example, a plurality of SGSNs and GGSNs and other nodes) can continue to operate without detailed knowledge of radio resource configuration.

Figure 3A:
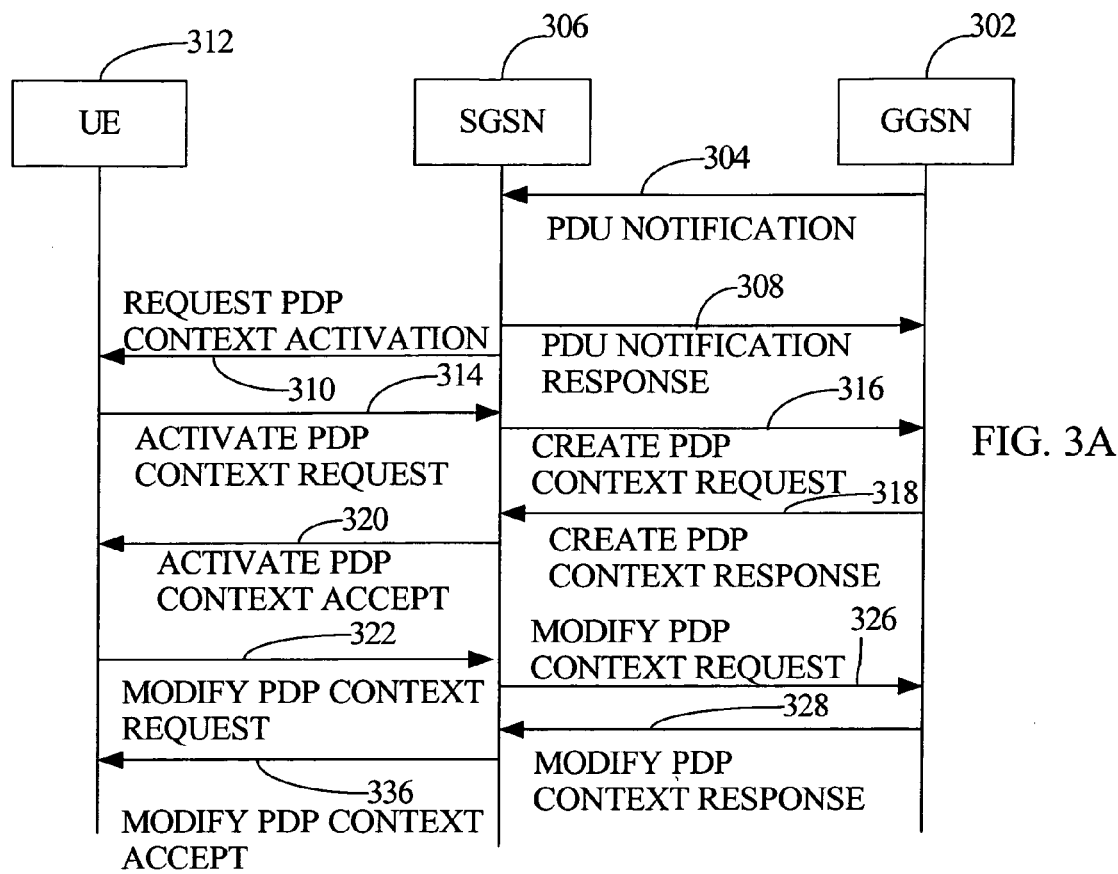
FIG. 3A illustrates messaging associated with modifying a packet data protocol (PDP) context initiated by a gateway general packet radio services (GPRS) support node (GGSN).

PDP context activation and QoS updating can be initiated by a network node instead of by user equipment. Such updating is associated with so-called "push" services. A GGSN initiated PDP context activation procedure is illustrated in FIG. 3A. In response to input data, a GGSN 302 issues a Protocol Data Unit (PDU) Notification 304 to an SGSN 306 that issues a PDU Notification response 308 to the GGSN 302. The SGSN 306 sends a request 310 for PDP context activation to a mobile station or other user equipment 312 that returns an activate PDP context request 314 to the SGSN 306. The SGSN 306 and the GGSN 302 exchange a create PDP context request 316 and a create PDP context response 318, and the SGSN 306 transmits an activate PDP context request accept message 320 to the user equipment 312.

A QoS associated with this PDP context can be updated in response to a request from the GGSN 302, the mobile station 312, or other network node. As shown in FIG. 3A, the SGSN 306 issues an Update PDP Context Request message 326 and the GGSN 302 returns an Update PDP Context Response message 328. The SGSN 306 sends a Modify PDP Context Request message 334 to the mobile station 312, and the mobile station 312 returns a Modify PDP Context Accept message 336 to the SGSN 306. In other examples, the mobile station 312 issues an Update PDP Context Request message, and the SGSN 306 returns an Update PDP Context Response message. The SGSN 306 and the GGSN 302 exchange a Modify PDP Context Request message and a Modify PDP Context Accept message, respectively. In other examples, PDP context updates can be initiated by a mobile station, a SGSN, a GGSN, or other network node.

Figure 3B:
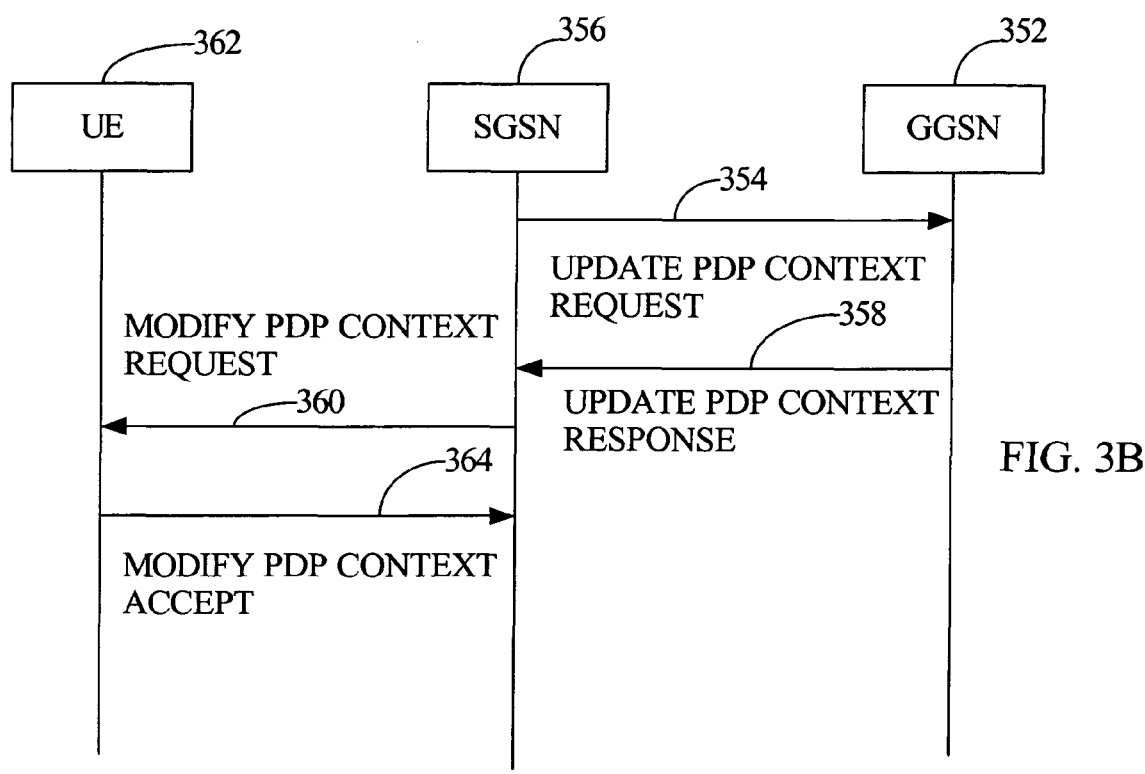
FIG. 3B illustrates messaging associated with modifying a packet data protocol (PDP) context initiated by a serving general packet radio services (GPRS) support node (GGSN).

Referring to FIG. 3B, in an SGSN initiated PDP context update procedure, an SGSN 356 issues an Update PDP Context Request message 356 to a GGSN 352, and the GGSN 352 returns an Update PDP Context Response message 358. The SGSN 356 issues a Modify PDP Context Request message 360 to a mobile station or other user equipment 362, and a Modify PDP Context Accept message 364 is returned to the SGSN 356. In the examples of FIGS. 3A-3B, PDP context updating is initiated by an SGSN or a GGSN, but generally PDP context updates can be initiated at any network node.

For some user applications, QoS or other PDP context parameters can vary depending on data requested or transmitted by the application. For example, an Instant Message (IM) service provider can offer text-based, voice-based, or multimedia-based services. Because text, voice, and multimedia services are typically associated with different QoS parameters, user selection of one such service within a messaging application can be associated with a new PDP context request and a new allocation of radio resources to achieve suitable performance. This new allocation process burdens network operation, and can be avoided with a request to update an existing PDP context with a new QoS as shown in FIGS. 2 and 3A-3B, so that an existing RAB can continue to be used.

Figure 4:
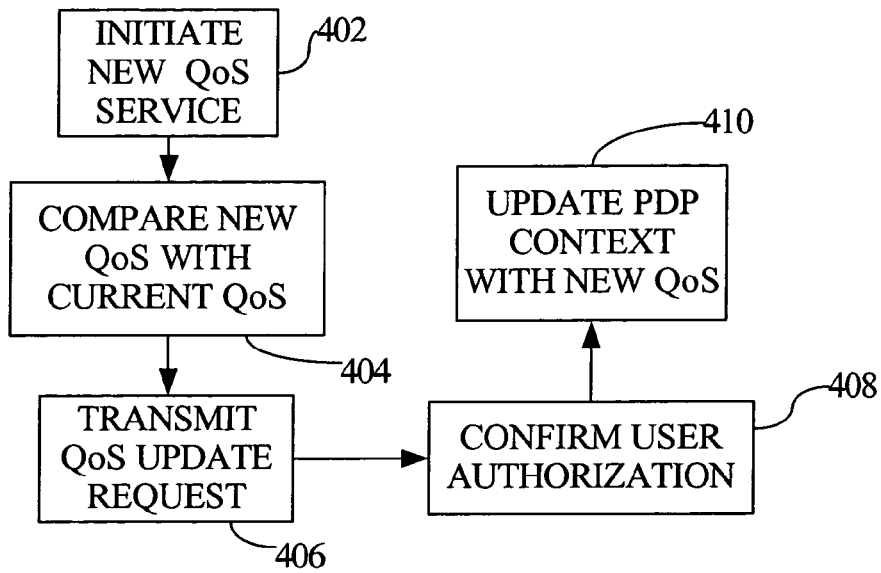
FIG. 4 is a block diagram of a method of updating a quality of service (QoS) for a current radio access bearer.

A method for obtaining a QoS update is shown in FIG. 4. A subscriber initiates an application or other service request associated with a new QoS in a step 402. For example, a subscriber using a messaging application switches from text to video messaging so that a preferred QoS changes. The new QoS is compared with a current QoS associated with a current radio access bearer (RAB) in a step 404. If the new QoS is different from the current QoS, the mobile station transmits a Modify PDP Context request to, for example, an associated SGSN in a step 406. The requested QoS update can be verified to determine subscriber authorization for this QoS in a step 408. Upon authorization, the PDP context is updated with the new QoS in a step 410 and communication based on the updated QoS can begin or resume.

QoS updates can be used to request larger or smaller bit rates, bit error rates, latencies, or other QoS parameters. For example, a subscriber using an interactive web browser for routine web browsing can be served satisfactorily with a QoS that does not provide a guaranteed bit rate. When the subscriber activates a video streaming application on the Internet, the subscriber device can provide a QoS indicator based on the desired attributes of the video streaming application. Upon receipt of this QoS indicator, a radio resource manager can modify radio bearer priority from interactive to streaming to accommodate the new application. The radio bearer receives the QoS information and determine if the priority or bandwidth needs to be changed and modify the bearer accordingly. For example, if the user application is change from a background e-mail application to a streaming video application, the radio bearer may use the physical reconfiguration to switch from a shared channel to a dedicated channel with a specific data rate. Similarly, if the bandwidth requirement for a new streaming application is different than the previous streaming application, the network can use the transport channel reconfiguration to adjust the radio bandwidth to satisfy the new data rate requirement. After the radio bearer is modified, when the subscriber terminates video streaming, a QoS indicator can be provided for routine web browsing, and the RAB priority can be changed from streaming back to interactive with similar radio bearer reconfigurations. As noted previously, QoS can be changed based on preferred communication parameters for either an uplink, downlink, or both, and can be initiated by a network subscriber or at other network nodes.

As shown above, existing RABs can be modified and new RABs are not needed, so that the transition from one QoS to another tends to be relatively transparent to the subscriber. In contrast, in conventional systems in which a new RAB is needed, the subscriber may experience an appreciable delay before the new RAB can be built. Modifying an existing RAB also reduces network overhead associated with constructing a new RAB. Because QoS can be dynamically assigned in a single RAB via a quality indicator associated with the application and stored on a user device, a network operator need not store a plurality of APNs for a particular destination from which differing QoS parameters are preferred. Thus, the HLR can contain fewer APN entries. As noted above, a change of QoS is not limited to initiation of new applications, but can be based on different requests within a previously initiated application.

Figure 5:
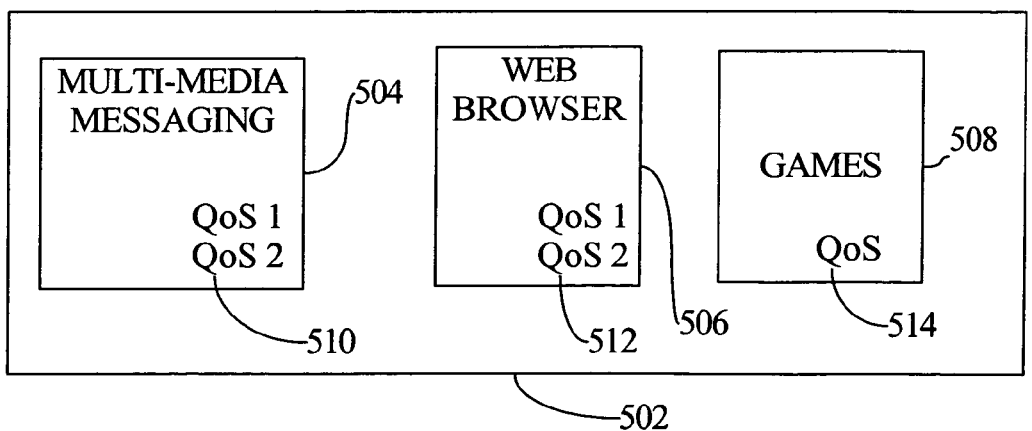
FIG. 5 illustrates a computer readable medium configured to store computer-executable instructions for a plurality of applications, each of which is associated with one or more QoS parameters.

Referring to FIG. 5, a computer readable medium 502 such as, for example, a floppy disk, hard disk, CD, DVD, random access memory, or other memory retains computer executable instructions for representative applications such as a multimedia messaging application 504, a web browser 506, and one or more games 508. As shown in FIG. 5, each of the applications 504, 506, 508 includes one or more QoS indicators 510, 512, 514, respectively. For some applications, two or more QoS indicators can be provided in accordance with the variable demands imposed by the application. Representative QoS parameters pertain to traffic handling priority (interactive class), guaranteed bit rate (streaming class), or other features. A portion of a SIM memory can be configured to store some applications or QoS parameters. These parameters can also be stored at one or more network nodes.

Figure 6:
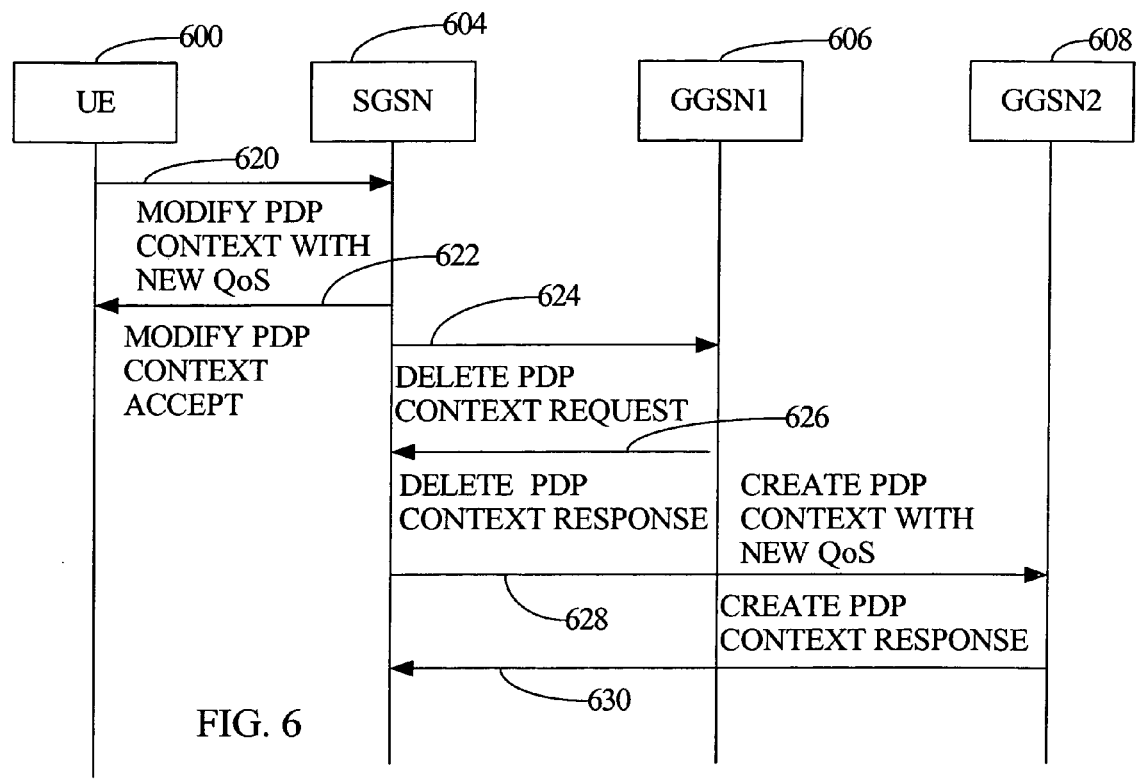
FIG. 6 illustrates messaging associated with modifying a current PDP context in use for communication with a current GGSN in response to a request for services associated with a different GGSN.

FIG. 6 illustrates reassignment of a radio access bearer with an updated QoS for communication with a different GGSN if the APN of the previous application is different than that of the new application indicating a different routing point. A mobile station 600 issues a modify PDP context request 620 to an SGSN 604 that returns Modify PDP Context Accept message 622. The SGSN issues a Delete Context Request 624 to a first GGSN 606 and an Create PDP Context Request 628 to a second GGSN 608. The GGSNs 606, 608 respond with messages 626, 630. respectively, and communication with the GGSN 608 can begin with an updated QoS but using the same RAB as previously used in communication with the GGSN 606.

Figure 7:
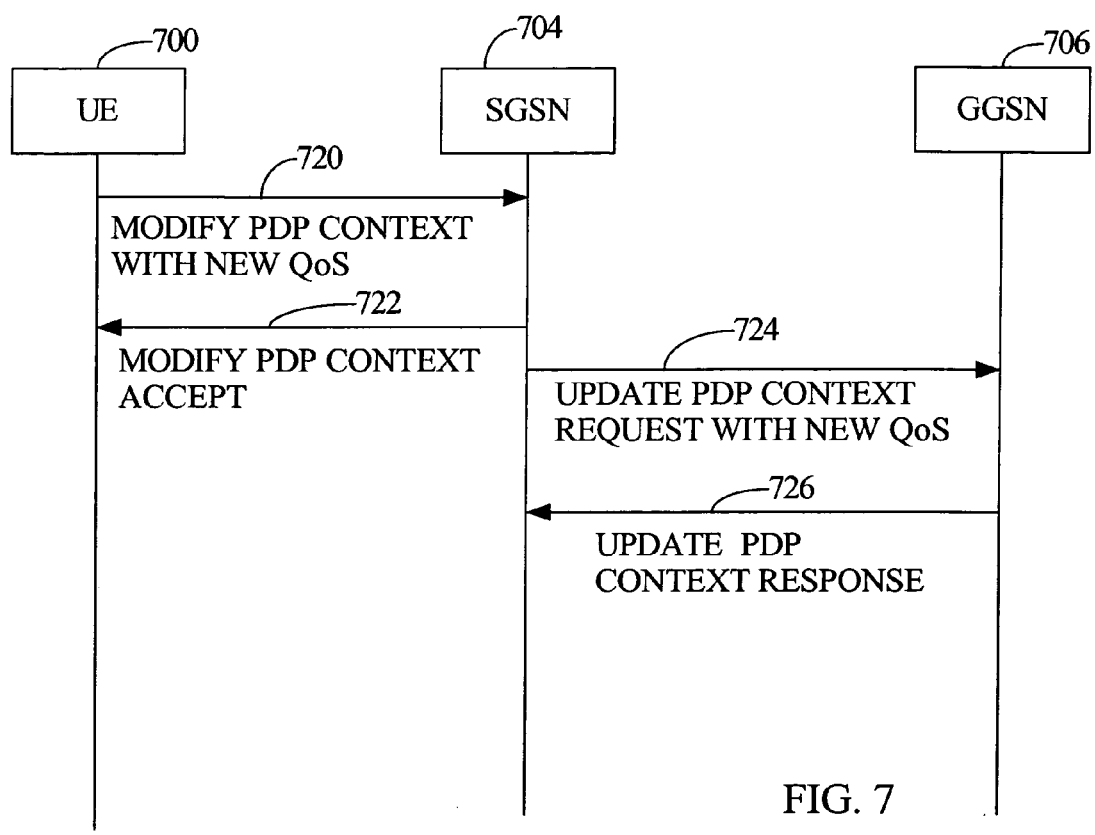
FIG. 7 illustrates messaging associated with modifying a current PDP context in use for communication with a current GGSN in response to a request for services associated with a new QoS requirement for communication with the current GGSN.

FIG. 7 illustrates reassignment of a radio access bearer with an updated QoS for communication with a currently selected GGSN with which a user communications are active based on a different QoS. A mobile station 700 issues a modify PDP context request 720 to an SGSN 704 that returns a Modify PDP Context Accept message 722. The SGSN 704 issues an Update Context Request 724 to a currently active GGSN 706. The GGSN 706 responds with an Update PDP Context Response message 726, and communication with the GGSN 706 begins with an updated QoS and using the same radio access bearer previously used in communication with the GGSN 706 if the new QoS does not demand change in the radio bearer. Otherwise, the radio bearer is modified per the new QoS and the communication continues with the GGSN 706.

Figure 8:
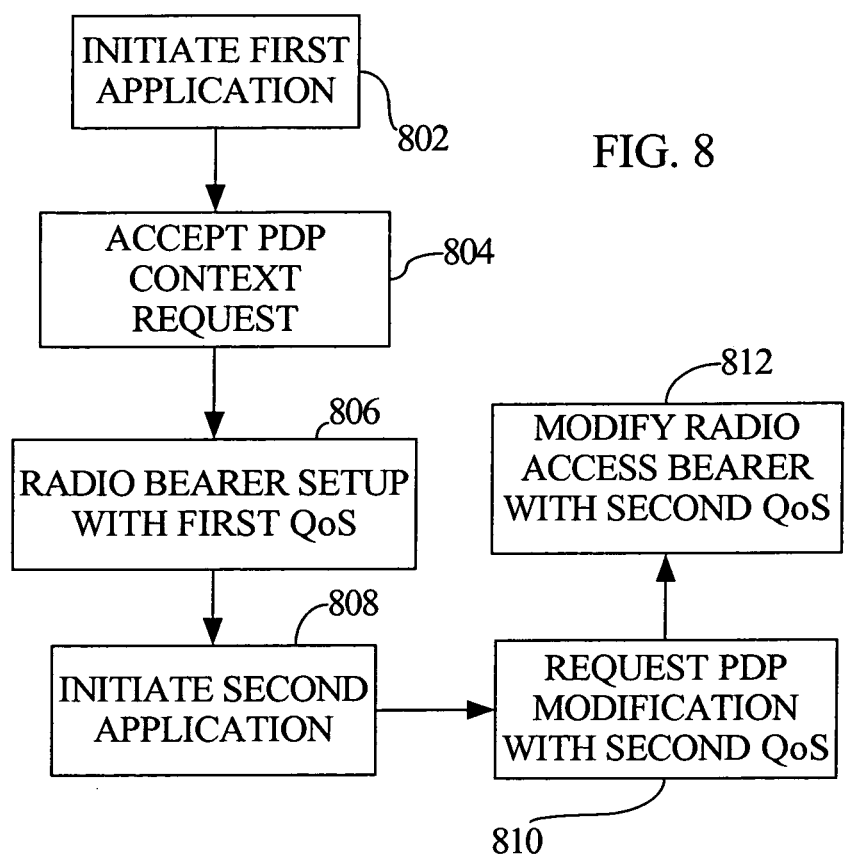
FIG. 8 illustrates a representative method of updating a PDP context associated with a first QoS based on a modification request associated with a second QoS.

A representative method is illustrated in FIG. 8. In a step 802, a user initiates a first application at a mobile station (or other user equipment), and transmits a request for services. The request can include one or more QoS parameters such as bit rate or bit error rate or a QoS class such as interactive or streaming. A PDP activation request is sent and accepted by an SGSN in a step 804, and setup of a radio bearer is completed by a UTRAN in a step 806. In a step 808, a user initiates a second application with a second QoS profile that is different than the first QoS profile. The network then requests modification of the PDP context activation with the new QoS profile in a step 810. The existing radio bearer is then modified based on the second QoS profile in step 812 The radio bearer can be modified in various ways. For example, a transport channel can be reconfigured if the data rate is changed. A channel type can be changed from, for example, a shared channel to a dedicated channel.

Representative examples of the technology are described above. In some examples, each application that can execute on a mobile station or other user equipment is associated with one or more QoS indicators that can be transmitted to a network node for updating a PDP context. The QoS indicators can be associated with one or more QoS attributes such as, for example, traffic handling priority (particularly for interactive service class) and guaranteed bit rate (particularly for streaming service class). User subscription parameters stored in an HLR can contain a highest QoS available to a particular user. Based on a QoS request, an updated QoS is provided that is suitable for the application requesting the updated QoS so that network resources are appropriately assigned to subscriber applications. A radio resource manager receives a requested QoS indicator from, for example, a mobile station, and determines a QoS based on the QoS indicator. The RRM then modifies an existing radio access bearer to provide the selected QoS. By adapting the QoS associated with an active RAB, radio resources can be efficiently assigned.

QoS can be a function of a variety of service attributes. For example, QoS can be based on service priority or service reliability. For some applications, QoS can be a function of delay or throughput. Attributes for priority, reliability, delay, and throughput can be assigned and updated in response to requests by a network node or a mobile station. Each of these attributes can be conveniently assigned two or more classes, and QoS updates can include any of these classes.

As disclosed herein, networks can be configured to modify QoS parameters of an established PDP context while maintaining an existing radio bearer, providing more efficient use of network resources and faster response to user service requests. Typically, a mobile station or other user equipment detects that a new application has been invoked with a QoS requirement different from that associated with an existing RAB. The mobile station transmits a Modify PDP Context Request with the desired QoS parameters to the network. An SGSN sends an Accept message back to the mobile station upon modification of the PDP Context by the RNC. A QoS Profile Negotiated parameter is assigned a value corresponding to QoS Profile Requested. The SGSN sends an Update PDP Context Request with the new QoS Profile to a GGSN, and the GGSN sends a response back to the SGSN and updates a QoS Profile Negotiated value. In this procedure, the RNC does not tear down the existing RAB or establish a new RAB and a new PDP context. The mobile station initiates the PDP context modification based on a new QoS, and the mobile station has the previously assigned radio resource available during PDP context modification, and there is little to no service interruption.

This disclosure describes dynamically adapting to changing Quality of Service (QoS) requirements without setting up multiple radio bearers to support multiple PDP contexts. A QoS indicator field can be added to applications on user devices and in the application layer. The devices can send QoS requests based on the application chosen by the user. The QoS indicator can provide the requested QoS attributes per each application, such as the traffic handling priority (THP) level for interactive class, or the guaranteed bit rate (GBR) requirement for streaming class, etc. The HLR user subscription (via APN) can contain the highest level of QoS purchased by the user. However, not all resources allowed will be assigned, instead, only the required or requested level of QoS per application is assigned from the radio resource to better use and prioritize network resources.

When a user requests an application, the radio resource management (RRM) algorithm residing in a radio access network can consider the attributes based on four QoS traffic classes prioritize users, and allocates radio resources accordingly. Without having to tear down and setup a new radio bearer with a different PDP context, the disclosed technology permits adaptation of radio resources to changing QoS requirements per different user applications. For example, if a user starts a data call with interactive web browsing, the RRM can establish the call with an interactive QoS class with no guaranteed bit rate. When the user finds a video streaming application on the web and has clicked on it to start a new application, the QoS attributes of this new application are then provided via the QoS indicator from the device's application to the wireless network. The RRM can take all attributes and determine that a streaming QoS is needed with a guaranteed bit rate. However, the RRM will not need to tear down the radio bearer and the PDP or add another PDP, instead, it can modify the radio bearer priority from interactive to streaming within the scheduler, and allow the user to get a streaming experience rather than an experience that is bursty without the delays associated with radio bear teardown and reconstruction.

QoS adaptation can be achieved within the RRM so that radio resources are used efficiently. Multiple PDP contexts are unnecessary, and dependency on the network and device capability is reduced. Simpler network and device configurations can be used due to simpler QoS adaptation, and user experience is superior. Moreover, because user service requests originating from a mobile station or other user equipment can include an indicator associated with a preferred QoS, a wireless network home location register (HLR) need not store QoS parameters for all access points, simplifying HLR creation and maintenance.

The disclosed technology permits efficient radio resource use and allocation. Radio bearers are reconfigured and need not become inactive as users transition from one application to another. Establishing a new radio bearer is a standard procedure, and reconfiguration can be used to meet changing QoS requests. Multiple PDP contexts and multiple radio bearers are not necessary. Either an application as situated on user equipment or at a network node can be used to identify or indicate a QoS preferred for a particular application, or for services provided within a selected application.

While the exemplary methods and apparatus are described based on GPRS communication within a GSM wireless communication network or 3G UMTS, these methods can be used communications based on other standards or protocols. We claim all that is encompassed by the appended claims.

We claim:

1. A network node, comprising:
    a receiver that communicates with user equipment on an established radio access bearer that was previously established for communicating at a first quality of service of a plurality of quality of services for an application, wherein the receiver accepts a requested quality of service indicator that is initiated by the user equipment for updating the first quality of service to a requested quality of service selected from the plurality of quality of services that is associated with the application chosen by a user, wherein the requested quality of service is associated with a bit error rate, wherein the receiver is for receiving an acknowledgement that the requested quality of service is accepted, wherein the acknowledgement is associated with an update of a packet data protocol context; and
    a transmitter that provides a request to a wireless communication network to update a current quality of service to the requested quality of service in the established radio access bearer that was previously at the first quality of service for the application without tearing down the established radio access bearer,
    wherein the established radio access bearer is providing an active service, wherein the requested quality of service impacts a decision as to whether a shared channel or a dedicated channel is used to support the established radio access bearer, wherein the request is associated with a request to update the packet data protocol context.

2. The network node of claim 1, further comprising a processor for making a determination whether the requested quality of service is different from the current quality of service, and to request a quality of service update based on the determination.

3. The network node of claim 1, wherein the requested quality of service is further associated with a bit rate.

4. The network node of claim 1, wherein the requested quality of service is further associated with a data latency.

5. A radio resource controller, comprising:
    a processor for establishing a radio resource allocation that was previously established based on a requested quality of service of a plurality of quality of services for an application, wherein the requested quality of service is initiated by a user equipment, wherein the requested quality of service is associated with the application chosen by a user, wherein the radio resource allocation is associated with a packet data protocol context; and
    an input for receiving an updated quality of service indicator for requesting an update to the requested quality of service, wherein the requested quality of service is associated with a bit error rate, wherein the updated quality of service indicator is associated with an updated quality of service of the plurality of services for the application, wherein the processor is for updating the requested quality of service of the radio resource allocation that was previously established during an ongoing communication based on the updated quality of service indicator without tearing down the established radio access bearer, wherein the ongoing communication is providing an active service, wherein the update to the requested quality of service impacts a decision as to whether a shared channel or a dedicated channel is used to support the radio resource allocation that was previously established.

6. The radio resource controller of claim 5, wherein the requested quality of service is further associated with a data rate.

7. The radio resource controller of claim 5, wherein the requested quality of service is further associated with a data latency.

8. The radio resource controller of claim 5, wherein the updated quality of service indicator is further associated with a service class change.

9. The radio resource controller of claim 8, wherein the service class change is selected from a group consisting of: conversational, streaming, interactive, and background service classes.

10. A method, comprising:
    transmitting, by a transmitter of a network node, a request for an established radio access bearer that was previously established for a first associated quality of service of a plurality of quality of services for an application, wherein the request is associated with updating a packet data protocol context, to provide an updated quality of service of the plurality of quality of services associated with the established radio access bearer in a wireless communication network without tearing down the established radio access bearer, wherein the established radio access bearer is providing an active service, wherein the updated quality of service is initiated by a user equipment by sending an updated quality of service indicator that is associated with the application chosen by a user, wherein the updated quality of service is associated with a bit error rate; and
    updating, by a processor of the network node, the first associated quality of service to the updated quality of service in response to the request for the established radio access bearer that was previously established, wherein the updated quality of service impacts a decision as to whether a shared channel or a dedicated channel is used to support the established radio access bearer.

11. The method of claim 10, wherein the established radio access bearer is with a mobile station, and further comprising, notifying the mobile station that the packet data protocol context has been updated.

12. The method of claim 10, further comprising verifying that the updated quality of service is authorized for the mobile station.

13. The method of claim 10, wherein the network node comprises a serving general packet radio services support node.

14. The method of claim 13, wherein the request to provide the updated quality of service is received by a gateway general packet radio services support node.

15. The method of claim 10, wherein the network node comprises a gateway general packet radio services support node.

16. The method of claim 15, wherein the request to provide the updated quality of service is received by a serving general packet radio services support node.

* * * * *